US005710200A

United States Patent [19]
Toratani et al.

[11] Patent Number: 5,710,200
[45] Date of Patent: Jan. 20, 1998

[54] NATURAL RUBBER TREATED WITH VISCOSITY STABILIZERS AND PRODUCTION THEREOF

[75] Inventors: Hirotoshi Toratani; Eiji Nakamura, both of Tokyo; Hideki Aoyama; Yasushi Hirata, both of Saitama, all of Japan

[73] Assignee: Bridgestone Corporation, Tokyo, Japan

[21] Appl. No.: 522,221

[22] Filed: Sep. 1, 1995

Related U.S. Application Data

[63] Continuation-in-part of Ser. No. 204,447, Mar. 2, 1994, abandoned.

[30] Foreign Application Priority Data

| Mar. 2, 1993 | [JP] | Japan | 5-41344 |
| Aug. 3, 1993 | [JP] | Japan | 5-192516 |
| Aug. 3, 1993 | [JP] | Japan | 5-192517 |

[51] Int. Cl.$^6$ ............................ C08K 5/24; C08F 8/30
[52] U.S. Cl. ........................... 524/191; 525/328.4
[58] Field of Search ................... 524/191; 525/328.4

[56] References Cited

U.S. PATENT DOCUMENTS

| T857,036 | 12/1968 | Straley et al. | 524/191 |
| 3,884,874 | 5/1975 | Rosenberger et al. | 524/191 |

FOREIGN PATENT DOCUMENTS

| 2146263 | 3/1973 | Germany | 524/191 |
| 1472064 | 4/1977 | United Kingdom . | |

OTHER PUBLICATIONS

Schnetger, j., Lexikon der Kautschuk-Technik, pp. 635–636, 1991.

*Primary Examiner*—Kriellion S. Morgan
*Attorney, Agent, or Firm*—Sughrue, Mion, Zinn, Macpeak & Seas, PLLC

[57] ABSTRACT

Natural rubber containing viscosity stabilizers is treated under drying conditions to result in 10% or less of the difference of gel content and 85% or more of molecular weight retention between before and after drying, and methods for manufacturing natural rubber comprise treating under drying conditions to result in 10% or less of the difference of gel content and 85% or more of molecular weight retention between before and after drying.

Natural rubber containing viscosity stabilizers is treated with a strainer, and methods for manufacturing natural rubber comprise treating with a strainer after compounding hydrazide stearate into the natural rubber.

Gelation (storage hardening) is suppressed and a decrease in molecular weight is prevented.

12 Claims, No Drawings

& # x20;

NATURAL RUBBER TREATED WITH VISCOSITY STABILIZERS AND PRODUCTION THEREOF

This is a Continuation-in-Part of application Ser. No. 08/204,447 filed Mar. 2, 1994, now abandoned.

BACKGROUND OF THE INVENTION

1. Field of the Invention

The present invention relates to natural rubber and manufacturing methods of natural rubber which impart a good processability and excellent physical properties, additives for natural rubber having the effect of a constant viscosity, natural rubber containing the additives, and methods for suppressing an increase in the viscosity of natural rubber with the additives.

2. Description of the Prior Art

In general, natural rubber is produced in tropical countries such as the Kingdom of Thailand, Malaysia, and The republic of Indonesia. Natural rubber is used widely and massively in the rubber industry, the tire industry and the like due to the excellent physical properties.

Immediately after natural rubber is produced, Mooney viscosity of the natural rubber is as low as 60~70. However, during several months when natural rubber is transported to Japan and the like, Mooney viscosity thereof increases up to nearly 90~100, that is, gelation takes place (so-called "storage hardening").

As a cause of storage hardening, it is well said that crosslinking is formed by the reaction of different kind bonds (an aldehyde group and the like) in an isoprene chain with protein and amino acids in natural rubber and then gelation takes place (the mechanism has not been determined clearly yet in literatures).

The gelation in natural rubber (an increase in the amount of gel) deteriorates processability. In general, natural rubber having a high molecular weight is preferable from the consideration of physical properties, and a decrease in molecular weight affects the physical properties of natural rubber.

Molecular weight and an amount of gel are greatly influenced by rubber coagulation from natural rubber latex, storage of natural rubber and drying conditions after water-washing.

As drying conditions in processes for producing natural rubber, there are two typical methods as follows. One is the ribbed smoked sheet (RSS) graded by Type Description and Packing Specifications for Natural Rubber Grade Used in International Trade (so-called "Green Book"), and the other is technically specified rubber (TSR). According to RSS, smoking is carried out at around 60° C. for 5~7 days, and in accordance with TSR, hot air-drying is carried out at around 120° C. for several hours.

However, there is a problem that the drying conditions at the time of manufacturing RSS promote the gelation of natural rubber. Also, there is a problem that the drying conditions at the time of manufacturing TSR lower the molecular weight of natural rubber. In addition, since in both RSS and TSR the viscosity thereof increases by gelation during storage (storage hardening), there is a problem that mastication causing a decrease in molecular weight is needed.

Most of natural rubber is usually manufactured in the order of tapping—coagulation—washing (water-washing)—dehydration—drying—packing. In the process, foreign materials may be removed, but not completely. Although there is some natural rubber containing viscosity stabilizers for natural rubber (hereinafter referred to as "viscosity stabilizer"), it is the present situation that foreign materials therein are not removed completely.

Therefore, when natural rubber is used in the rubber industry, it is necessary to carry out decreasing Mooney viscosity by masticating in order to decrease an amount of gel and straining thereafter in order to remove foreign materials.

However, according to conventional techniques, there has not been obtained natural rubber having a high molecular weight and no foreign material. In other words, natural rubber has to be used as it is in order to maintain a high molecular weight thereof, and in this case, there are some problems that natural rubber contains a lot of foreign materials and gel. On the other hand, in order to remove foreign materials in natural rubber or decrease an amount of gel, some processes such as masticating and straining are needed, but these processes disadvantageously lead to a decrease in the molecular weight of the natural rubber due to the mastication and the like.

Accordingly, it is antinomy to obtain natural rubber having a high molecular weight and no foreign material using conventional techniques, and it is not possible to meet both demands.

In order to prevent the above-mentioned storage hardening, Rubber Research Institute of Malaysia (RRIM) has developed a technique that natural rubber latex is treated with about 0.08 wt % to 0.30 wt % of hydroxylamine sulfate ($NH_2OH \cdot H_2SO_4$) to prepare the natural rubber having a constant viscosity. There has been also developed the type (SMR-GP) that a solution of the same hydroxylamine sulfate is incorporated in natural rubber dried.

However, natural rubber having a constant viscosity due to hydroxylamine sulfate has the following disadvantages (1) It is hard to use hydroxylamine sulfate in Japan, since it is specified as a deleterious substance.

(2) An increase in viscosity is found in the early stage of storage.

(3) An effect of a constant viscosity deteriorates in severe circumstances (e.g. around 60° C. in an oven).

(4) Compatibility with rubber and the dispersibility therein are poor.

(5) The decomposition temperature is low, and the effect of a constant viscosity does not become sufficient on mixing at a high temperature.

In the literature (B. C. Sekhar, J. Polymer Science, vol.XLVIII, 133(1960)) which shows the results of screening of additives for natural rubber having an effect of a constant viscosity, semicarbazide ($NH_2NHCONH_2$) is referred to. As additives having a likely effect of a constant viscosity, hydroxylamine sulfate, semicarbazide and dimedone(1,1-dimethylcyclohexane-3,5-dione) are shown in the literature.

However, when an amount of each additive is less than some lower limit, it is confirmed with some fluctuation that from the beginning an effect of a constant viscosity is low or viscosity increases from a certain time. The causes are considered as follows:

a) additives do not disperse sufficiently due to the small amount thereof b) a certain amount of additives needs to block aldehyde groups and the like which are considered to cause gelation.

SUMMARY OF THE INVENTION

An object of the present invention is to solve a problem concerning drying conditions in the above-mentioned conventional manufacturing processes of natural rubber, that is, to solve the problem concerning the drying conditions at the time of manufacturing RSS or TSR.

Another object of the present invention is to attempt the suppression of gelation and the prevention of a decrease in molecular weight.

Still another object is to provide natural rubber having both a good processability and excellent physical properties and a manufacturing method thereof.

Yet another object of the present invention is to solve the above-mentioned conventional antinomy problem, that is, the problem that natural rubber having a high molecular weight and no foreign material cannot be obtained.

A further object of the present invention is to solve a problem concerning the above-mentioned conventional viscosity stabilizers.

A still further object is to provide an additive for natural rubber having a safe handling, a large and long-lasting effect of a constant viscosity.

A yet further object is to provide an additive-contained rubber composition and a method for suppressing an increase in the viscosity of natural rubber with additives.

Aspects of the present invention are as follows:

(1) Natural rubber containing viscosity stabilizers for natural rubber comprising hydrazide compounds of the following general formula,

R—CONHNH$_2$ where R is selected from the group consisting of an alkyl group having 1 to 30 carbon atoms, a cycloalkyl group having 3 to 30 carbon atoms and an aryl group;

(2) The natural rubber according to item (1) above in which drying is conducted under conditions to result in 10% or less of the difference of gel content and 85% or more of molecular weight retention between before and after drying;

(3) Natural rubber containing the viscosity stabilizers set forth in item (1) which is treated with a strainer;

(4) A manufacturing method of natural rubber which comprises drying and compounding viscosity stabilizers for natural rubber comprising hydrazide compounds of the following general formula,

R—CONHNH$_2$ where R is selected from the group consisting of an alkyl group having 1 to 30 carbon atoms, a cycloalkyl group having 3 to 30 carbon atoms and an aryl group;

(5) A manufacturing method of natural rubber which comprises treating with a strainer after compounding viscosity stabilizers into the natural rubber;

(6) An additive for natural rubber which comprises hydrazide compounds of the following general formula,

R—CONHNH$_2$ where R is selected from the group consisting of an alkyl group having 1 to 30 carbon atoms, a cycloalkyl group having 3 to 30 carbon atoms and an aryl group;

(7) A rubber composition which comprises natural rubber containing hydrazide compounds of the following general formula,

R—CONHNH$_2$ where R is selected from the group consisting of an alkyl group having 1 to 30 carbon atoms, a cycloalkyl group having 3 to 30 carbon atoms and an aryl group; and (8) A method for suppressing an increase in the viscosity of natural rubber which comprises adding to the natural rubber hydrazide compounds of the following formula,

R—CONHNH$_2$ where R is a member selected from the group consisting of an alkyl group having 1 to 30 carbon atoms, a cycloalkyl group having 3 to 30 carbon atoms and an aryl group.

DETAILED DESCRIPTION OF THE INVENTION

According to the present invention, natural rubber containing viscosity stabilizers can be prepared by mixing viscosity stabilizers into dried natural rubber. It is necessary to add viscosity stabilizers to dried natural rubber as quickly as possible since gelation (storage hardening) proceeds even when the natural rubber dried is left at room temperature.

As viscosity stabilizers used when natural rubber is prepared, there may be used, for example, hydroxylamine sulfate, semicarbazide, dimedone(1,1-dimethylcyclohexane-3,5-dione) and hydrazide compounds (additives for natural rubber used in the present invention) of the following general formula (I),

R—CONHNH$_2$     (I)

where R is selected from the group consisting of an alkyl group having 1 to 30 carbon atoms, a cycloalkyl group having 3 to 30 carbon atoms and an aryl group.

When these viscosity stabilizers are compounded into natural rubber, these viscosity stabilizers react with bonds of a different kind in an isoprene chain (such as an aldehyde group) resulting in blocking said bonds. Consequently, this reaction results in the prevention of the gelation reaction in natural rubber which causes the storage hardening and the suppression of an increase in an amount of gel.

Exemplary suitable hydrazide compounds having an alkyl group of 1~30 carbon atoms of the above-mentioned general formula (I) include: acethydrazide, hydrazide propionate, butylhydrazide, hydrazide laurate, hydrazide palmitate, hydrazide stearate and the like.

Exemplary suitable hydrazide compounds having a cycloalkyl group of 3~30 carbon atoms of the above-mentioned general formula (I) include: cyclopropyl hydrazide, cyclohexyl hydrazide, cycloheptyl hydrazide and the like.

A hydrazide compound having an aryl group of the above-mentioned general formula (I) may contain substituents, and examples of said compound include phenyl hydrazide (C$_6$H$_5$-CONHNH$_2$), o-, m-, p-tolyl hydrazide, p-methoxyphenyl hydrazide, 3,5-xylyl hydrazide, 1-naphthyl hydrazide and the like.

As a hydrazide compound of the above-mentioned formula (I), a fatty acid hydrazide having an alkyl chain is preferable.

Although the above-mentioned hydroxylamine sulfate, semicarbazide and dimedone have been known as a viscosity stabilizer, it has not been known at all to compound these viscosity stabilizers into natural rubber. For the first time, the present inventors have succeeded in developing the above-mentioned techniques. It can be attained for the first time to prevent a decrease in molecular weight and to suppress an increase in an amount of gel by employing viscosity stabilizers.

Hydrazide compounds of the above-mentioned general formula (I) are known materials, and manufacturing methods thereof are also known. However, it has not been known that the above-mentioned viscosity stabilizers of the present invention are compounded into natural rubber.

Hydrazide compounds of the above-mentioned general formula (I) are safe to handle. These compounds impart the effect of a constant viscosity when these compounds are added to natural rubber, and the effect of a constant viscosity lasts for a long time.

As an embodiment to use hydrazide compounds of the above-mentioned general formula (I) as an additive for natural rubber, for example, some cases are considered that these compounds are added to natural rubber produced to prevent storage hardening, or these compounds are added in the stage of mastication and the like.

A rubber composition according to the present invention comprises natural rubber containing hydrazide compounds of the above-mentioned general formula (I).

When viscosity stabilizers are used for natural rubber, an amount of a compound selected from hydroxylamine sulfate, semicarbazide, dimedone or each hydrazide compound of the above-mentioned general formula (I) is 0.001 part by weight or more based on 100 parts by weight of the natural rubber.

An amount of viscosity stabilizers which comprise hydrazide compounds of the above-mentioned general formula (1) is also 0.001 part by weight or more based on 100 parts by weight of natural rubber.

When the amount of each viscosity stabilizer used for natural rubber or a rubber composition is less than 0.001 part by weight based on 100 parts by weight of the natural rubber, the viscosity of natural rubber is not stabilized sufficiently. Although an amount of viscosity stabilizers depends on a variety of natural rubbers used (produced) and a variety of viscosity stabilizers used, the amount preferably ranges from 0.01 to 3.0 parts by weight based on 100 parts by weight of natural rubber.

For instance, regarding hydroxylamine sulfate, semicarbazide and dimedone, the amount thereof preferably ranges from 0.01 to 2.0 parts by weight based on 100 parts by weight of natural rubber.

As far as the above-mentioned general formula (I) is concerned, when R of carbon number ranges from 1 to 5, the content of each hydrazide compound preferably ranges 0.01 to 0.5 part by weight, more preferably 0.03 to 0.25 part by weight based on 100 parts by weight of natural rubber. In the case of acethydrazide having 1 of carbon number, the lower limit is desired to be 0.04 part by weight or more. With regard to each hydrazide compound having R of carbon number ranging from 15 to 20, preferably the content thereof ranges from 0.1 to 0.5 parts by weight based on 100 parts by weight of natural rubber, more preferably 0.25 part parts by weight or less. In the case of hydrazide palmitate having 15 of carbon number, the lower limit is desired to be 0.15 part by weight or more, and in the case of hydrazide stearate having 17 of carbon number, the lower limit is preferred to be 0.16 part by weight or more.

The hydrazide compounds of the above-mentioned general formula (I) may be contained individually or jointly in natural rubber and a rubber composition in the range of above-mentioned content. Exemplary suitable hydrazide compounds of the above-mentioned general formula (I) above include acethydrazide, hydrazide propionate, butylhydrazide, hydrazide laurate, hydrazide palmitate, hydrazide stearate, cyclopropyl hydrazide, cyclohexyl hydrazide, phenyl hydrazide and the like.

In addition to the above-mentioned viscosity stabilizers, if necessary, there may be compounded an optional component, such as softener, antioxidant and the like into natural rubber.

Natural rubber containing the above-mentioned viscosity stabilizers may be also treated under drying conditions to result in 10% or less of the difference of gel content and 85% or more of molecular weight retention, preferably 5% or less of the difference of gel content and 90% or more of molecular weight retention between before and after drying.

Although drying conditions which keep the difference of gel content 10% or less and the molecular weight retention 85% or more vary depending upon the kind and the grade of natural rubber used (produced), it is preferable that drying temperature is set at 80°~100° C. and drying time is as short as possible in order to prevent gelation and a decrease in molecular weight.

Since the scission of a molecular chain takes place remarkably above 100° C., it is preferable that drying temperature is set at 80°~100° C. On the contrary, a gel formation rate becomes fast at less than 80° C. Therefore, it is expected that this drying condition suppresses gelation and prevents a decrease in molecular weight of natural rubber.

In manufacturing methods of the natural rubber treated in the order of tapping—coagulation—washing(water washing)—dehydration—drying—packing, natural rubber having a high molecular weight and no foreign material may be obtained, for example, by mixing viscosity stabilizers and the natural rubber with a mixer, an extruder and the like after conventional drying or treating under the above-mentioned drying conditions and by treating with a strainer thereafter.

Natural rubber having a high molecular weight and no foreign material according to the present invention contains viscosity stabilizers and is treated with a strainer.

An object of a strainer treatment is to remove foreign materials in natural rubber containing viscosity stabilizers. As an example of the strainer treatment, foreign materials can be removed by letting natural rubber containing viscosity stabilizers through a mesh-like material formed at the point of an extruder. The size of the mesh corresponding to 0.355 mm (No.45) defined by ASTM E11 is preferable. However, the size of the mesh may be changed suitably for natural rubber produced and the size of foreign materials contained in the natural rubber and the like.

In order to disperse viscosity stabilizers sufficiently, mixing is necessary. Besides, in order to let rubber through a strainer, heating (100° C. or less) is necessary. Therefore, it is efficient to carry out simultaneously the mixing of viscosity stabilizers and a strainer treatment. Also, in order to suppress gelation caused by heating rubber, it is necessary to add viscosity stabilizers before a strainer treatment. Consequently, it is desired that a strainer treatment is carried out immediately after mixing viscosity stabilizers for natural rubber.

The present invention provides a method for suppressing an increase in the viscosity of natural rubber which comprises adding to the natural rubber hydrazide compounds of the above-mentioned general formula (I). An amount of the hydrazide compounds added is preferably 0.001 part by weight or more based on 100 parts by weight of natural rubber.

When an amount of hydrazide compounds added is less than 0.001 part by weight, an increase in the viscosity of natural rubber may not be suppressed sufficiently. An amount of hydrazide compounds added depends on natural rubber and hydrazide compounds. Preferably, the addition amount thereof ranges from 0.01 to 3.0 parts by weight based on 100 parts by weight of natural rubber.

The range of the addition amount of each hydrazide compound used for a method for suppressing an increase in the viscosity of natural rubber is the same as that of the content of hydrazide compounds used for natural rubber as a viscosity stabilizer.

The effects of the present invention are as follows.

(1) Natural rubber containing viscosity stabilizers and treated under the drying conditions of the present invention and the manufacturing methods thereof result in a good processability and excellent physical properties of the natural rubber since a decrease in molecular weight and an increase in an amount of gel do not happen even after drying.

(2) Natural rubber mixed with viscosity stabilizers and treated with a strainer in accordance with the present invention and the manufacturing methods thereof impart a good processability and excellent physical properties to the natural rubber since a decrease in molecular weight and an increase in the amount of gel do not happen and natural rubber is substantially free from foreign materials.

Natural rubber obtained by the present invention can be suitably used for a raw material needing a high precision such as dimensional stability and the like, for instance, tires for a plane, a bead inflation rubber. When hydrazide compounds shown in the present invention are used for natural rubber as a viscosity stabilizer, the natural rubber and the manufacturing methods thereof lead to a good processability and excellent physical properties (3) Additives for natural rubber according to the present invention obstruct a reaction of gelation in the natural rubber and suppress an increase in the viscosity of the natural rubber for a long time. Accordingly, when the additives are added to natural rubber produced, it is possible to prevent storage hardening.

(4) Since there is suppressed an increase in the viscosity of a rubber composition according to the present invention for a long time, the viscosity remains so low that a mastication process is not needed. Consequently, the shortage of Banbury mixers can be solved, and it is expected that it is possible to improve the productivity remarkably, and it is possible to reduce the cost drastically.

(5) By methods for suppressing an increase in the viscosity of natural rubber according to the present invention, the increase in the viscosity of the natural rubber can be suppressed for a long time.

The present invention is now more particularly described by means of the following examples and comparative examples, but the present invention is not limited by these examples.

EXAMPLE 1, COMPARATIVE EXAMPLES 1~2

Natural rubber was prepared by using an unsmoked sheet as raw rubber based on the drying conditions shown in the following Table 1.

With respect to each of natural rubber, an amount of gel and molecular weight were determined before drying and after leaving dried natural rubber at 60° C. for 20 days, respectively. There were also determined carbon black dispersibility and tensile strength of natural rubber which was left at 60° C. for 20 days and then was vulcanized.

The results are shown in the following Table 1.

An amount of gel, molecular weight, carbon black dispersibility and tensile strength of rubber vulcanized were determined by the following methods.

(1) Amount of gel 0.2 g of rubber is dissolved in toluene (first grade) (60 cc), and gel is separated by centrifuging. After drying gel, an amount of the gel was determined.

(2) Molecular weight

Molecular weight was determined by a gel permeation chromatography method. Gel Permeation Chromatograph HCL-8020 manufactured by Toso K.K. was used for measurement. For a column, GMHXL manufactured by Toso K.K. was used. For calibration, a standard polystyrene manufactured by Toso K.K. was used. THF (first grade) was used as a solvent, and 0.01 g sample/30 cc THF was used as a solution.

(3) Carbon black dispersibility

Dispersibility was determined using a microscope based on ASTM D2663B. The larger the value, the better the dispersibility.

(4) Tensile properties of rubber vulcanized

With regard to the preparation of rubber vulcanized, compounding was carried out based on ASTM D3184 and Standard Formula 2A was used.

Tensile testing was carried out based on ASTM D1278.

Table 1 shows the following findings.

Example 1 shows natural rubber treated under the drying conditions of the present invention and containing a viscosity stabilizer. Because of the viscosity stabilizer and the drying conditions of the present invention, an increase in an amount of gel was substantially low and the molecular weight was held substantially constant for 20 days after drying. Also, carbon black dispersibility and tensile strength of the natural rubber vulcanized were good even after leaving the natural rubber at 60° C. for 20 days.

Comparative Examples 1 and 2 are beyond the scope of the present invention and Comparative Example 1 is based on drying conditions of a conventional RSS, and Comparative Example 2 is based on drying conditions of a conventional TSR.

In comparative Example 1, after leaving the natural rubber at 60° C. for 20 days, an amount of gel increased remarkably though the molecular weight thereof was maintained substantially constant. Carbon black dispersibility and tensile strength of the natural rubber vulcanized became poor.

In comparative Example 2, after leaving the natural rubber at 60° C. for 20 days, an amount of gel increased remarkably and the molecular weight thereof decreased drastically. Carbon black dispersibility and tensile strength of the natural rubber vulcanized became poor.

EXAMPLES 2~3, COMPARATIVE EXAMPLES 3~6

Natural rubber was prepared by using an unsmoked sheet as raw rubber based on the treatments shown in the following Table 2. The natural rubber was left at 60° C. for 20 days.

After leaving natural rubber was finished, an amount of gel, molecular weight, an amount of foreign materials were determined and carbon black dispersibility and tensile strength of rubber vulcanized were determined as well.

The results obtained are shown in the following Table 2.

An amount of gel, molecular weight, carbon black dispersibility and tensile strength of rubber vulcanized were determined based on the above-mentioned methods (1)~(4). An amount of foreign materials was determined based on the following method (5).

(5) Amount of foreign materials

As a metal mesh for a strainer to remove foreign materials, there was used a mesh corresponding 0.355 mm (No.45) defined by ASTM E11.

Table 2 shows the following findings.

Examples 2 and 3 are within the scope of the present invention, and a viscosity stabilizer was contained in natural rubber, and a strainer treatment was carried out. According to Examples 2 and 3, even after leaving natural rubber for 20 days, an increase in an amount of gel and a decrease in molecular weight were suppressed, and the natural rubber is substantially free from foreign materials. Also, carbon black dispersibility and tensile strength of the rubber vulcanized were good.

Comparative Examples 3~6 are beyond the scope of the present invention. In Comparative Example 3, a viscosity stabilizer was not contained and a strainer treatment was not carried out. According to Comparative Example 3, an increase in an amount of gel became remarkable, and the natural rubber contains large amount of foreign materials. Also, carbon black dispersibility and tensile strength of the rubber vulcanized became poor.

In Comparative Example 4, a viscosity stabilizer was not contained, and a strainer treatment was carried out. Although the natural rubber is substantially free from foreign materials, an increase in the amount of gel became remarkable and carbon black dispersibility and tensile strength of rubber vulcanized became poor as well.

In Comparative Example 5, a viscosity stabilizer was not contained, and a strainer treatment was carried out, and furthermore, a mastication treatment was carried out. Although an increase in an amount of gel was suppressed, a decrease in molecular weight was remarkable, and tensile strength of the rubber vulcanized became poor.

In Comparative Example 6, a viscosity stabilizer was contained, but a strainer treatment was not carried out. Although an increase in an amount of gel was suppressed, the natural rubber contains large amount of foreign materials, and moreover, carbon black dispersibility and tensile strength of the rubber vulcanized became poor.

EXAMPLES 4~11, COMPARATIVE EXAMPLES 7~9

In the following Table 3 there are shown additives for natural rubber, the content thereof and the change of Mooney viscosity with time.

The preparation of a rubber composition (masticated rubber) containing additives for natural rubber used in Examples 4~11, Comparative Examples 7~9 and a measurement method of Mooney viscosity are as follow.

EXAMPLES 4 AND 5

In the process of mastication, 100 parts by weight of natural rubber (RSS#4) and 0.08 part by weight of peptizer, 0.16 or 0.32 part by weight of hydrazide stearate were mixed, and then a masticated rubber was obtained.

EXAMPLES 6 AND 7

By the same way as in Examples 4 and 5, 0.15 or 0.30 part by weight of hydrazide palmitate was mixed, and then a masticated rubber was obtained.

EXAMPLE 8

By the same way as in Examples 4 and 5, 0.04 part by weight of acethydrazide was mixed, and then a masticated rubber was obtained.

EXAMPLES 9 and 10

By the same way as in Examples 4 and 5, 0.07 or 0.20 part by weight of hydrazide stearate was mixed, and then a masticated rubber was obtained.

EXAMPLE 11

By the same way as in Examples 4 and 5, 0.10 part by weight of phenylhydrazide was mixed, and then a masticated rubber was obtained.

COMPARATIVE EXAMPLES 7 AND 8

Only 100 parts by weight of natural rubber (RSS#4) and 0.08 part by weight of peptizer were mixed, and then a masticated rubber was obtained (Comparative Example 7). 100 parts by weight of natural rubber (RSS#4), 0.08 part by weight of peptizer and 0.07 part by weight of hydroxylamine sulfate were mixed, and then a masticated rubber was obtained (Comparative Example 8).

COMPARATIVE EXAMPLE 9

By the same way as in Examples 4 and 5, 0.04 part by weight of semicarbazide, ($NH_2$—$CONHNH_2$), was mixed, and then a masticated rubber was obtained.

A measurement method of Mooney viscosity

In order to confirm whether a constant viscosity is attained, after the masticated rubber of Examples 4~11 and Comparative examples 7~9 was left in an oven at 60° C. to make a hardening acceleration circumstance, the change of Mooney viscosity with time was determined.

As is clear from Table 3, compared to Comparative Examples 7~9, Mooney viscosity of Examples 4~11 hardly changes with time, and an effect of a constant viscosity lasts for a long time. Especially, concerning an effect of a constant viscosity, the Examples 4~11 of the present invention are superior to Comparative Examples 8 and 9 using conventional additives for natural rubber.

TABLE 1

| | | Example | Comparative Example | |
|---|---|---|---|---|
| | | 1 | 1 | 2 |
| Drying conditions | Drying time | 2 hours | 5 days | 2 hours |
| | Drying temperature | 100° C. | 60° C. | 120° C. |
| | Viscosity stabilizer for natural rubber*1 | present | absent | absent |
| Amount of gel | Before drying | 3% | 3% | 3% |
| | 20 days after drying | 9% | 27% | 31% |
| | Difference of gel content | +6% | +24% | +28% |
| Molecular weight | Before drying | $2.2 \times 10^6$ | $2.2 \times 10^6$ | $2.2 \times 10^6$ |
| | 20 days after drying | $1.9 \times 10^6$ | $2.0 \times 10^6$ | $1.5 \times 10^6$ |
| | Retention | 86% | 91% | 68% |
| After 20 days | Carbon black dispersibility | 89% | 68% | 64% |
| | Tensile strength (kg/cm$^2$) | 301 | 284 | 276 |

*1: 0.2 phr of hydrazide stearate is contained.

TABLE 2

|  | Example | | Comparative Example | | | |
|---|---|---|---|---|---|---|
|  | 3 | 4 | 3 | 4 | 5 | 6 |
| Viscosity stabilizer for natural rubber*1 | present | present | absent | absent | absent | present |
| Strainer treatment*2 | present | present | absent | present | present | absent |
| Mastication*3 | absent | absent | absent | absent | present | absent |
| After 20 days Amount of gel (%) | 6 | 5 | 31 | 29 | 7 | 8 |
| Molecular weight | $2.1 \times 10^6$ | $2.2 \times 10^6$ | $2.3 \times 10^6$ | $2.2 \times 10^6$ | $1.6 \times 10^6$ | $2.3 \times 10^6$ |
| Amount of foreign materials (%) | 0.05 | 0.04 | 0.31 | 0.07 | 0.06 | 0.28 |
| Carbon black dispersibility (%) | 92 | 93 | 66 | 70 | 91 | 90 |
| Tensile strength (kg/cm$^2$) | 305 | 307 | 276 | 283 | 291 | 288 |

*1: In Example 3 and Comparative Examples 3–6, 0.3 phr of hydrazide stearate is contained. In Example 4, 0.1 phr of hydrazide propionate is contained.
*2: A strainer treatment on a general extruder using a mesh corresponding to 0.355 mm (NO. 45) defined by ASTM E11.
*3: Mastication with a Banbury mixer.

TABLE 3

|  | Example | | | | | | | | Comparative Example | | |
|---|---|---|---|---|---|---|---|---|---|---|---|
|  | 5 | 6 | 7 | 8 | 9 | 10 | 11 | 12 | 7 | 8 | 9 |
| Hydrazide stearate | 0.16 | 0.32 | — | — | — | 0.07 | 0.20 | — | — | — | — |
| Hydrazide palmitate | — | — | 0.15 | 0.30 | — | — | — | — | — | — | — |
| Acethydrazide | — | — | — | — | 0.04 | — | — | — | — | — | — |
| Phenyl hydrazide | — | — | — | — | — | — | — | 0.10 | — | — | — |
| Hydroxylamine sulfate | — | — | — | — | — | — | — | — | — | 0.07 | — |
| Semicarbazide | — | — | — | — | — | — | — | — | — | — | 0.04 |
| Mooney viscosity immediately after mastication | 58.3 | 61.5 | 60.3 | 55.4 | 58.9 | 59.0 | 57.5 | 71.0 | 65.0 | 67.3 | 61.4 |
| After 3–4 days (60° C.) | 56.0 | 57.7 | 57.1 | 51.5 | 56.3 | 60.5 | 58.3 | 74.5 | 70.2 | 81.3 | 59.0 |
| After 6–7 days (60° C.) | 56.7 | 56.7 | 57.0 | 51.0 | 57.2 | 62.0 | 58.0 | 75.1 | 81.3 | 81.5 | 62.8 |
| After 10 days (60° C.) | 54.5 | 55.5 | 58.1 | 51.6 | 58.0 | 63.0 | 59.0 | 76.2 | 83.9 | 82.0 | 68.9 |
| After 22 days (60° C.) | 55.1 | 53.6 | 61.5 | 46.5 | 61.6 | 62.8 | 59.3 | 75.3 | 88.2 | 83.0 | 79.5 |

What is claimed is:

1. A method of treating natural rubber in which gelation of the natural rubber is suppressed, comprising the steps of:
   drying the natural rubber;
   before the natural rubber gels compounding into the natural rubber based on 100 parts by weight of the natural rubber 0.01 to 0.5 part by weight of a hydrazide compound as a viscosity stabilizer represented by the following general formula:

R—CONHNH$_2$ wherein R is selected from the group consisting of an alkyl group having 1 to 30 carbon atoms, a cycloalkyl group having 3 to 30 carbon atoms and an aryl group; and
   reacting the hydrazide compound with functional groups of a polyisoprene molecule in the natural rubber to cap the functional groups.

2. The method of treating natural rubber according to claim 1, wherein the hydrazide compound is present in an amount of 0.03 to 0.25 part by weight based on 100 parts by weight of the natural rubber.

3. The method of treating natural rubber according to claim 1, wherein R is an alkyl group having 1 to 2 carbon atoms.

4. The method of treating natural rubber according to claim 1, wherein the drying is conducted under conditions to result in a 10% or less difference of gel content and 85% or more molecular weight retention between before and after the drying.

5. The method of treating natural rubber according to claim 1, wherein the drying is conducted at a temperature ranging from 80° to 100° C.

6. The method of treating natural rubber according to claim 1, further comprising the step of:
   treating the natural rubber with a strainer.

7. A method of treating natural rubber in which gelation of the natural rubber is suppressed, comprising the steps of:
   before the natural rubber gels compounding into the natural rubber based on 100 parts by weight of the natural rubber 0.01 to 0.5 part by weight of a hydrazide compound as a viscosity stabilizer represented by the following general formula:

R—CONHNH$_2$ wherein R is selected from the group consisting of an alkyl group having 1 to 30 carbon atoms, a cycloalkyl group having 3 to 30 carbon atoms and an aryl group;
   drying the natural rubber; and
   reacting the hydrazide compound with functional groups of a polyisoprene molecule in the natural rubber to cap the functional groups.

8. The method of treating natural rubber according to claim 7, wherein the hydrazide compound is present in an amount of 0.03 to 0.25 part by weight based on 100 parts by weight of the natural rubber.

9. The method of treating natural rubber according to claim 7, wherein R is an alkyl group having 1 to 2 carbon atoms.

10. Natural rubber containing 0.01 to 0.5 part by weight of a hydrazide compound based on 100 parts by weight of the natural rubber as a viscosity stabilizer represented by the following general formula:

$$R\text{—CONHNH}_2$$

wherein R is selected from the group consisting of an alkyl group having 1 to 30 carbon atoms, a cycloalkyl group having 3 to 30 carbon atoms and an aryl group.

11. The natural rubber according to claim 10, wherein the hydrazide compound is present in an amount of 0.03 to 0.25 part by weight based on 100 parts by weight of the natural rubber.

12. Natural rubber containing 0.01 to 0.5 part by weight of a hydrazide compound based on 100 parts by weight of the natural rubber as a viscosity stabilizer represented by the following general formula:

$$R\text{—CONHNH}_2$$

wherein R is an alkyl group having 1 to 2 carbon atoms.

* * * * *